No. 884,490. PATENTED APR. 14, 1908.
A. W. HARPSTRITE.
POWER DRIVEN PLOW.
APPLICATION FILED OCT. 17, 1906.
2 SHEETS—SHEET 1.
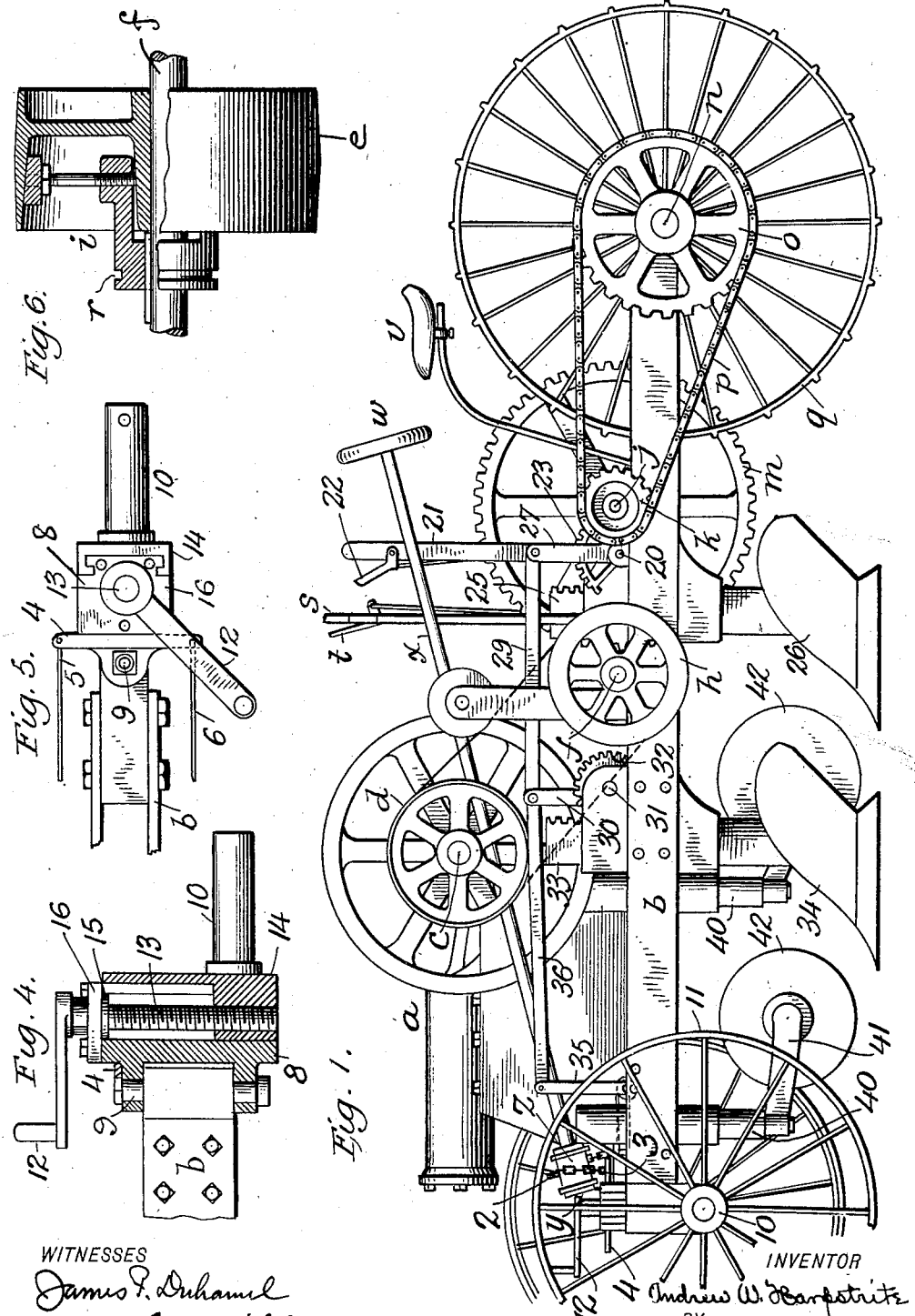
WITNESSES
James P. Duhamel
M. Hamilton,
INVENTOR
Andrew W. Harpstrite
BY
James Hamilton
ATTORNEY No. 884,490. PATENTED APR. 14, 1908.
A. W. HARPSTRITE.
POWER DRIVEN PLOW.
APPLICATION FILED OCT. 17, 1906.
2 SHEETS—SHEET 2.
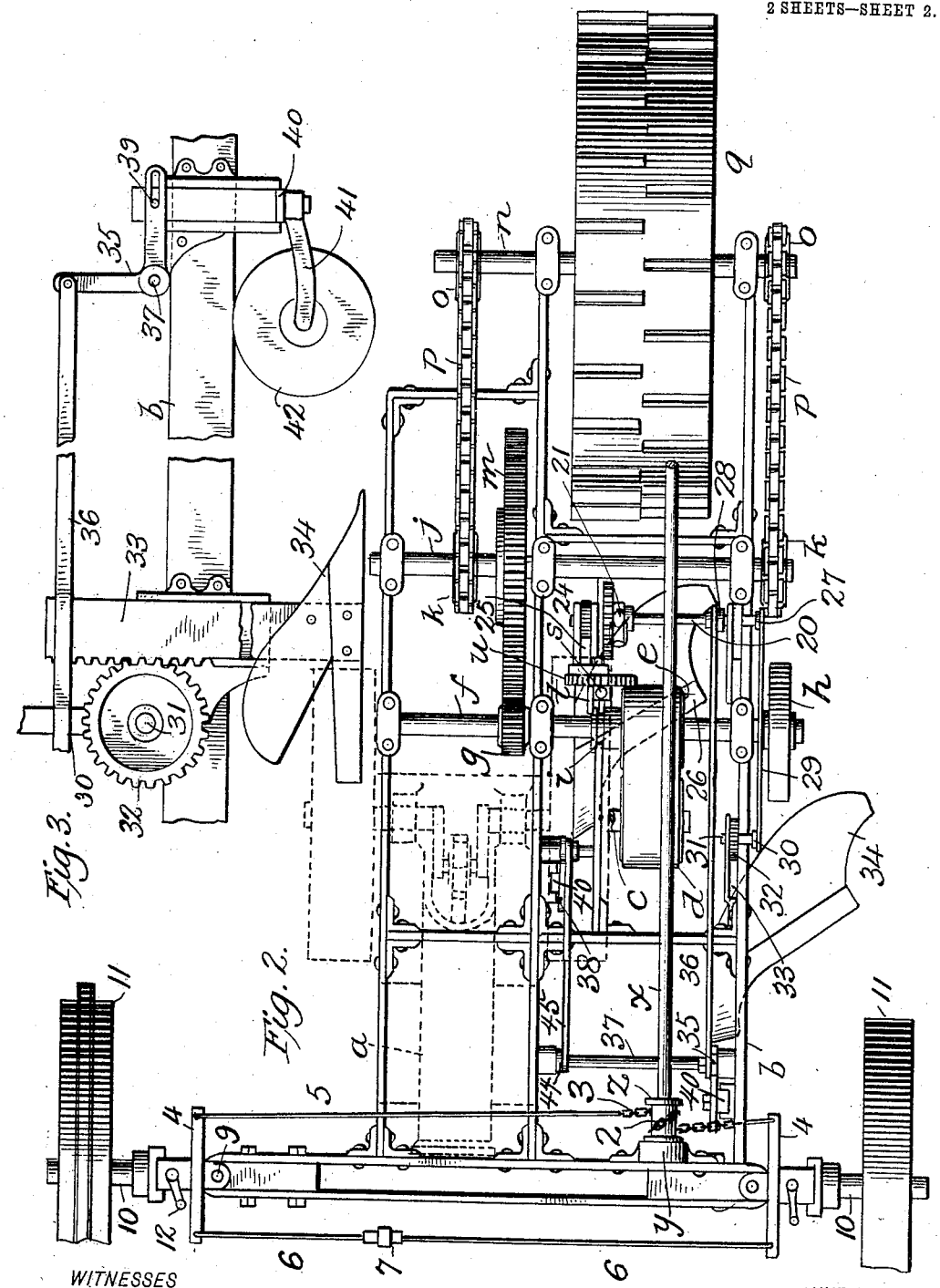
WITNESSES
James F. Duhamel
M. Hamilton
INVENTOR
Andrew W. Harpstrite
BY
James Hamilton
ATTORNEY

UNITED STATES PATENT OFFICE.

ANDREW W. HARPSTRITE, OF MOWEAQUA, ILLINOIS.

POWER-DRIVEN PLOW.

No. 884,490.  Specification of Letters Patent.  Patented April 14, 1908.

Application filed October 17, 1906. Serial No. 339,368.

*To all whom it may concern:*

Be it known that I, ANDREW W. HARPSTRITE, a citizen of the United States, residing at Moweaqua, in the county of Shelby and State of Illinois, have invented certain new and useful Improvements in Power-Driven Plows, of which the following is a specification, reference being had to the accompanying drawings.
My invention relates to improvements in plows and particularly to power-propelled plows.

One object of my invention is to provide such a plow with a simple and highly efficient mechanism for propelling the plow.

Another object of my invention is to provide the plow with a steering mechanism which will be readily controlled and which responds quickly to the operations of the driver.

A further object of my invention is to provide the plow with novel mechanism for adjusting the wheels so as to maintain the plow level whatever may be the inclination of the terrain.

A fourth object of my invention is to provide the plow with novel means for raising and lowering the colters and plowshares.

In the drawings illustrating the principle of my invention and the best mode now known to me of applying that principle, Figure 1 is a side elevation of my new plow; Fig. 2 is a plan view of the same, the engine being shown in dotted lines; and Figs. 3, 4, 5 and 6 are details hereinafter referred to.

The mechanism for propelling the plow comprises an engine $a$ of any suitable type (a gas engine is preferred, because of its compact nature, its adaptability to use where units of small power are needed and its small cost of attendance and up-keep) which is mounted upon the frame $b$ of the plow and upon the main shaft $c$ of which is fast a pulley $d$ belt-connected to the pulley $e$ loose upon the transverse shaft $f$ (Fig. 2) upon which are also mounted the pinion $g$, the fly-wheel $h$ and the slidable clutch $i$, the latter being keyed to the shaft $f$. Parallel with the latter shaft is the shaft $j$ upon which are mounted the sprockets $k$ and the spur-gear $m$, the latter being in mesh with and hence driven by the pinion $g$. In the rear of the main frame $b$ is mounted a shaft $n$ which is driven by the sprockets $o$ connected by the drive-chains $p$ with the sprockets $k$. Upon the shaft $n$ is mounted the traction or propeller wheel $q$. The clutch $i$ is shown in Fig. 6 in detail and is formed with a circumferential groove $r$ within which engages the lower end of a clutch-lever $s$ held in its adjusted position by the engagement of the latch device $t$ with the toothed segment $u$.

The plowman sits in the seat $v$ and steers the plow by means of the hand-wheel or steering-wheel $w$ mounted upon the rod or stem $x$ at the rear end thereof, the front end (Fig. 2) being journaled at $y$ in the frame $b$ and provided with a grooved collar or hub $z$ from which project the pins or studs 2 which engage the links of the steering chain 3 the ends of which are connected to the rear end of the bars 4 by rods 5. The front ends of the bars 4 are connected by the rods 6 the inner ends of which are joined by a turnbuckle 7. The bars 4 are secured to the brackets 8 which are hinged at 9 (Figs. 4 and 5) to the front part of the main frame $b$, (Fig. 2), and which support the axles 10 upon which turn the front wheels 11. The latter may be adjusted vertically so as to level the plow by turning the crank-handles 12, each of which is fastened to the top of a screw 13 the lower end of which engages a block 14 from the front face of which projects one of the axles 10 and which is free to slide and carry the axle or spindle 10 up or down, when the crank 12 is turned. The screw 13 is formed near its upper end with a collar 15 and is free to rotate in the top-plate 16.

To raise and lower the colters and the plows the following mechanism is provided: Fast to the shaft 20 is secured an operating lever 21 provided with a latch device 22 the lower end of which is adapted and designed to engage the toothed segment 23 to lock the lever 21 in its adjusted position. On the inner end of the shaft 20 is mounted a toothed wheel 24 in mesh with the rack 25 on the lower end of which is mounted the plowshare 26, while upon the outer end of the shaft 20 are mounted two crank-arms 27, 28 the first of which is connected by a link 29 with a crank-arm 30 fast upon the stub-shaft 31 which carries a gear 32 that meshes with a rack 33 upon the lower end of which is the other plowshare 34. The second crank-arm 28 is connected with a bell-crank 35 by the link 36; and the bell-crank 35 is fast upon a shaft 37 which carries at its inner end the crank-arm 44 connected by the link 45 with a bell-crank 38, the bell-cranks 35, 38 being entirely similar and shown in Fig. 3. As is therein shown, the outer end of each of the bell-cranks is slotted and in the slot engages a stud 39 which projects from the colter-carrying shaft 40 the lower end of which is formed with the forks 41 in which is rotatably mounted the colter 42. From the foregoing description and an inspection of the drawings, it will be evident that by swinging the lever 21, the colters and the plowshares may be raised and lowered.

The traction or propeller wheel $q$ travels directly in rear of the plowshare 26, and, therefore, in the furrow last turned by that plowshare. The plow will turn the soil to either the right or to the left by the use of properly formed plowshares.

What I claim is:

The combination in a plow, of a frame, soil-turning devices carried thereby, blocks pivoted to the frame and arranged to swing horizontally, vertically-disposed screws journaled and held against vertical movement in said blocks and equipped with handles fixed to the screws, axle members slidable vertically on said blocks and having portions engaging the said screws, wheels carried by the said axle members, bars fixed to and extending fore and aft from the blocks, a rigid connection intermediate the forward portions of the said bars, a steering shaft mounted in the frame at a point between the said bars, and connections intermediate the rear portions of the bars and the steering shaft.

In testimony whereof I have hereunto set my hand at said Moweaqua in the presence of two witnesses this 3rd day of October, 1906.

ANDREW W. HARPSTRITE.

Witnesses:
BEN F. HUDSON,
S. J. BURKITT.